US012612907B2

(12) United States Patent
Shrivastava et al.

(10) Patent No.: US 12,612,907 B2
(45) Date of Patent: Apr. 28, 2026

(54) ROD PUMP OPTIMIZATION USING ADAPTIVE MACHINE LEARNING

(71) Applicant: Schlumberger Technology Corporation, Sugar Land, TX (US)

(72) Inventors: Kaustubh Shrivastava, Houston, TX (US); Abhishek Sharma, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 379 days.

(21) Appl. No.: 18/366,801

(22) Filed: Aug. 8, 2023

(65) Prior Publication Data

US 2025/0052238 A1     Feb. 13, 2025

(51) Int. Cl.
| | |
|---|---|
| *G05B 13/02* | (2006.01) |
| *F04B 47/02* | (2006.01) |
| *F04B 49/06* | (2006.01) |

(52) U.S. Cl.
CPC .......... *F04B 49/065* (2013.01); *F04B 47/026* (2013.01); *G05B 13/0265* (2013.01)

(58) Field of Classification Search
CPC ... F04B 49/065; F04B 47/026; G05B 13/0265
USPC ........................................................ 700/282
See application file for complete search history.

(56) References Cited

U.S. PATENT DOCUMENTS

| | | | |
|---|---|---|---|
| 2019/0063194 A1* | 2/2019 | Berland | E21B 47/008 |
| 2021/0081823 A1* | 3/2021 | Boguslawski | G06N 5/04 |
| 2021/0172301 A1* | 6/2021 | Abdeldaim | F04B 47/02 |
| 2021/0262327 A1* | 8/2021 | Berland | E21B 43/34 |
| 2021/0404329 A1* | 12/2021 | Roriz | E21B 7/00 |
| 2022/0381120 A1* | 12/2022 | Nimbalkar | G05B 13/0265 |
| 2023/0184239 A1* | 6/2023 | Armacanqui | G05B 23/024 |
| | | | 700/282 |
| 2024/0401586 A1 | 12/2024 | Ambade | |

FOREIGN PATENT DOCUMENTS

WO          2021126613 A1     6/2021

* cited by examiner

*Primary Examiner* — Jigneshkumar C Patel
(74) *Attorney, Agent, or Firm* — Kyle R. Miiller

(57)          ABSTRACT

Approaches for controlling operations of a sucker rod pump system of a production well that produces reservoir fluids from a reservoir, which employs a gateway device disposed at a wellsite corresponding to the well and a cloud-computing system operably coupled to the gateway device. The gateway device may communicate time-series operational data characterizing operation of the sucker rod pump system to the cloud-computing system. The cloud-computing system can receive and store the time-series operational data communicated from the gateway device and repeatedly perform operations that i) process the time-series operational data to train a machine learning model that predicts run time of the sucker rod pump system given feature data extracted the time-series operational data and ii) use the resultant machine learning model to determine new operating parameter data for use in controlling the sucker rod pump system, wherein the new operating parameter data maximizes production from the well.

16 Claims, 10 Drawing Sheets

Scale for predicted
production – number
of strokes

1500

1200

900

600

300

Time of shut down 3000  2750  2500  2250  2000  1750  1500  1250

4.0

4.5

5.0

5.5 SPM 6.0

6.5

7.0

ROD PUMP OPTIMIZATION USING ADAPTIVE MACHINE LEARNING

BACKGROUND

1. Field

The present disclosure relates to operational surveillance, diagnostics, and optimization of oilfield artificial lift systems, such as rod pump systems.

2. State of the Art

In many oilfields around the world, a large number of wells have been drilled and put into production with various artificial lift techniques, including rod pump systems (which are also referred to as sucker rod systems). A typical rod pump system employs a number of interconnected rods which are referred to as a rod string. The rod string is coupled to an actuating device at the surface. A subsurface pump is coupled to the rod string at a desired location in the well. The actuating device is typically embodied by a pump jack of the walking beam type which is coupled to the rod string by a rod hanger. The actuating device imparts reciprocating motion to the rod string which causes the pump to capture and lift formation fluids to the surface. The actuating device is driven by a prime mover, which is typically embodied by an electric motor or internal combustion engine. The prime mover typically delivers high-speed, low-torque rotational power to a gear reducer, which converts that rotational power into low-speed, high-torque rotational power supplied to the pump jack. The pump jack converts the rotational power output by the gear reducer into reciprocating motion that lifts and lowers the rod string connected to the subsurface pump. The operation of the prime mover is typically controlled by a controller (referred to herein as a rod pump controller), which is typically embodied by a computer-based system or other electronic control device.

In deep wells, the rod string can experience considerable stretch, distributed mass, etc., and the motion at the pump end may be radically different from that imparted at the surface. In order to better inform the operation the rod pump system, some conventional rod pump systems include one or more sensor systems to gather information about one or more states of the rod pump system. Some of these sensor systems utilize a load cell or dynamometer which measures the tensile load of the rod string. The dynamometer is an instrument which records a curve, typically referred to as a Dynacard or Dynagraph, of load versus displacement for the rod string. The shape of this curve reflects the operational conditions of the rod pump system over the pumping action (or strokes) of the system. Other sensor systems use a shockwave-based system which measures fluid height in a casing surrounding the rod string and production fluid tubing. Some other sensor systems may measure motor current, voltage, and/or instant RPM to evaluate the torque generated by the motor. The geometry of the rod string and the motor torque may then be used to evaluate the tensile loading of the rod string. In conventional systems, the rod pump system state information gathered by the sensor system over time can be analyzed and interpreted by manual visual inspection or by automated apparatus and procedures in order to monitor the performance characteristics of the rod pump system over time.

Rod pump systems are typically managed by engineers to maintain the operating parameters of the system at optimum conditions. At optimum conditions, the rod pump system should produce reservoir fluid at the rate at which the reservoir supplies reservoir fluid to the well. If the rod pump system is operated slower than the production rate from the reservoir, the reservoir fluid will build up in the wellbore and apply back pressure. This in turn will reduce the production rate from the reservoir. If the rod pump system is operated at a faster rate than what the reservoir can support, the rod pump system can experience gas ingress. In this case, the rod pump system is typically shut down for a certain period to have fluid buildup again before starting to pump again. Also, as the condition of the reservoir changes due to production, it becomes a challenging task to maintain the pump at best operating conditions continuously. As rod pumps are often operated at unoptimized conditions, operator companies can lose production from the reservoir which directly impact their revenue. Also, such operations can lead to damage to the rod pump systems, which can result in an increase in the maintenance cost of the rod pump systems.

Another challenge associated with rod pump systems arises due to the remote nature of these wells. As oil and gas wells are often located in isolated and remote places, it becomes difficult for the engineers to attend and manage these pumps actively. In addition, the large number of pumps in fields also make it challenging for engineers to actively track and manage them. This leads to some wells remaining idle for extended periods which can result in loss of hydrocarbon production and can affect the reservoir conditions. In colder regions, idle pumps can cause wax/paraffin deposition that can lead to damage to the rod pump system.

SUMMARY

Systems and methods are provided for controlling operations of a sucker rod pump system of a production well that produces reservoir fluids from a reservoir, which employs a gateway device disposed at a wellsite corresponding to the well and a cloud-computing system disposed remotely from the wellsite and operably coupled to the gateway device. The gateway device includes at least one first interface that is operably coupled to the sucker rod pump system and at least one second interface that is operably coupled to the cloud-computing system. The gateway device is configured to communicate time-series operational data characterizing operation of the sucker rod pump system to the cloud-computing system. The cloud-computing system is configured to receive and store the time-series operational data communicated from the gateway device and repeatedly perform operations that i) process the time-series operational data to train a machine learning model that predicts run time of the sucker rod pump system given feature data extracted from the time-series operational data and ii) use the resultant machine learning model to determine new operating parameter data for use in controlling the sucker rod pump system, wherein the new operating parameter data maximizes production from the well.

In embodiments, the processing of the time-series operational data in i) can involve filtering the time-series operational data. The filtering of the time-series operational data can be configured to extract time-series operational data generated within a predefined most recent time window. The predefined most recent time window can be selected or tuned for the reservoir.

In embodiments, the processing of the time-series operational data in i) can further involve extracting feature data from the filtered time-series operational data and using the feature data to train the machine learning model to predict run time of the sucker rod pump system until next shutdown, wherein the feature data characterizes both past behavior of the sucker rod pump system and current operating condition of the sucker rod pump system.

In embodiments, the feature data that characterizes past behavior of the sucker rod pump system can represent at least one previous shutdown period of the pump.

In embodiments, the feature data that characterizes current operating condition of the sucker rod pump system can represent at least one of volume fraction of liquid in the pump, strokes per minute, and run time of the pump.

In embodiments, the machine learning model can be trained using label data representing run time of the pump until next shutdown as extracted from the time-series operational data for different points of time of operation of the sucker rod pump system.

In embodiments, the trained machine learning model can be used in ii) to predict run time of the pump until next shutdown over varying operating parameters, and the run time of the pump until next shutdown over the varying operating parameters can be used to calculate production over the varying operating parameters and determine the new operating parameter data that maximizes production from the well.

In embodiments, the new operating parameter data can be used in controlling the sucker rod pump system in a manual mode that involves human review and acceptance of the new operating parameter data. In other embodiments, the new operating parameter data can be used in controlling the sucker rod pump system in a fully-autonomous mode without human involvement.

In embodiments, the at least one first interface of the gateway device can include at least one of a wired communication interface and a wireless communication interface, and the at least one second interface of the gateway device can include at least one of a cellular data communication interface and a satellite data communication interface.

In embodiments, the rod pump system can include at least one sensor disposed at the wellsite, and the time-series operational data communicated from the gateway device to the cloud-computing system can be based on data produced by the at least one sensor. For example, the at least one sensor can include a load cell or dynamometer which measures rod string tensile loading of the rod pump system.

In embodiments, the rod pump system can include a controller that controls operation of the prime mover of the rod pump system, and the new operating parameter data can be used to generate at least one command communicated from the gateway device to the controller in order to control the operation of the sucker rod pump system.

DETAILED DESCRIPTION OF THE PREFERRED EMBODIMENTS

Figure 1:
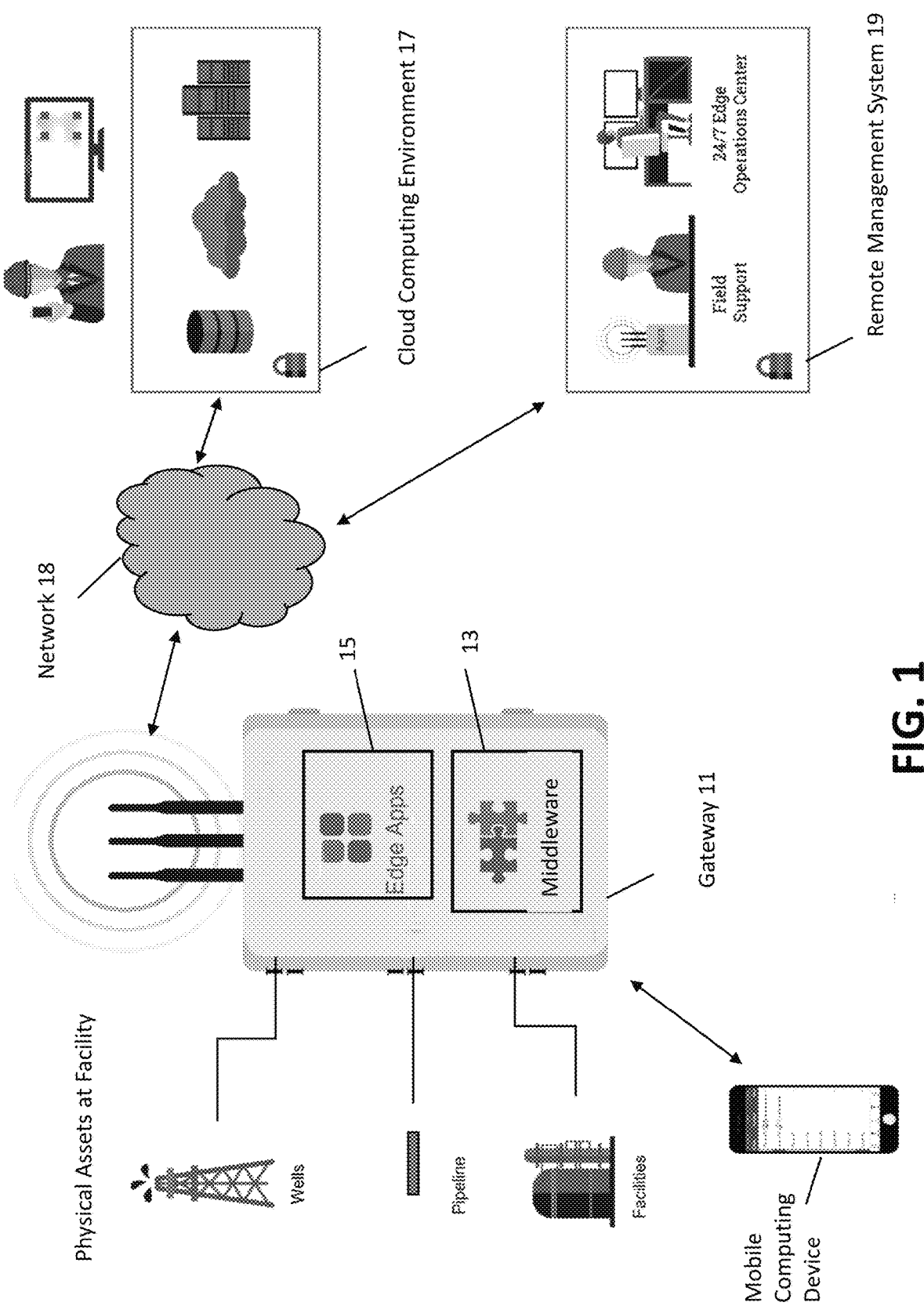
FIG. 1 is a schematic diagram of an exemplary distributed computing platform for operational surveillance and optimization of oilfield facilities.

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

The present disclosure provides systems and methods that employ a distributed computing platform for operational surveillance and optimization of oilfield artificial lift systems, including rod pump systems. The distributed computing platform can be configured to perform such operational surveillance and optimization of oilfield artificial lift systems using fast loop control where a combination of physics and data driven workflows allows operator users to optimize production from a well and focus on problem wells in a proactive manner.

The distributed computing platform can be configured to interface to a variety of sensor instrumentation used in oilfield artificial lift systems and implement various communication protocols to connect to such sensor instrumentation, which allows for monitoring, diagnostics, and automated control of wells. Sensor data output by such sensors can be collected and processed by a gateway located at the wellsite in real-time. Data analytics and/or machine learning and/or artificial intelligence can be used to analyze the sensor data to aid in optimizing performance of the artificial lift system and offer preventative maintenance to improve operational life.

In embodiments, the distributed computing platform can be embodied by an open, secure, and scalable distributed computing platform. The platform can enable oil and gas industry operators to connect physical assets at oil and gas facilities to the digital world. Such physical assets can include equipment or sensor(s) located at facilities such as well sites, well pads, pipelines, other field facilities, oil and gas processing and storage facilities, terminals and transport hubs, and other oil and gas facilities, which are referred to as a "facility" or "facilities" herein. Data generated by a physical asset at a facility can be collected and processed at the facility and/or in a cloud computing environment to monitor operating conditions and status of the physical asset in real-time, employ data analytics and/or machine learning and/or artificial intelligence to determine or recommend updates to the operational parameters of the physical asset based on the real-time operating conditions or status, and use the updates to the operational parameters of the physical asset to control the operation of the physical asset. The physical asset(s) at the facility can be controlled remotely from commands issued by the cloud computing environment and/or from commands issued by autonomous control operations performed at the facility. The platform can be configured to utilize advanced digital technologies of Industrial Internet of Things (IIoT), edge computing, cloud computing, data analytics, machine learning and artificial intelligence to improve the operational efficiency of the physical assets, to improve the safety of workforce, and to reduce environmental impact and carbon footprint.

For the sake of description, the architecture of the platform can be divided into five distinct parts as shown in FIG. 1. These five part include i) edge gateway 11 that resides at a facility (e.g., wellsite); ii) middleware 13 executing on the gateway 11; iii) one or more edge applications 15 executing on the gateway 11; iv) a cloud computing environment 17 that is located remotely from the facilities and configured to execute one or more cloud applications that cooperate with the edge application(s) executing on the gateway(s) 11 via data communication therebetween; and v) a remote management system 19 that is located remotely from the facilities and configured to remotely manage one or more gateways 11 via data communication therebetween.

The gateway 11 can be a ruggedized computing device that can be configured to deliver performance edge computing and secure data ingestion. The gateway 11 can be configured to enable real time monitoring and control of the physical asset(s) at a facility (e.g., wellsite). The gateway 11 can be configured with data analytics and/or machine learning and/or artificial intelligence to detect and classify events that reflect operational state of the physical asset(s) at the facility (e.g., wellsite) based on the real-time data generated at the facility (e.g., wellsite). The gateway 11 can also be configured for autonomous control of the physical asset(s) at a facility (e.g., wellsite) based on the events that reflect the operational state of the physical asset(s) at the facility as determined by the data analytics and/or machine learning and/or artificial intelligence.

The gateway 11 can be configured to receive, collect, and aggregate data from a variety of operational equipment (such as sensors, controllers, actuators, programmable logic controllers, remote terminal units, and supervisory control and data acquisition (SCADA) systems), prepare such data for transmission to the cloud computing environment 17, and transmit the data from the gateway 11 to the cloud computing environment 17 over a data communication network 18, such as a cellular data network, satellite link or other mode of available data communication as shown in FIG. 1.

The gateway 11 can be configured to interface to the remote management system 19 over the data communication network 18 as shown in FIG. 1. The remote management system 19, which can be implemented in a cloud computing environment, provides for remote monitoring and control of the gateway 11 as well as remote management of security policies and remote management (such as over-the-air updates) of middleware 13 and/or the edge application(s) 15 that execute on the gateway 11.

The gateway 11 can be housed in a compact and rugged NEMA/IP rated enclosure for outdoor use, making it suitable for the environments at well sites and facilities. The overall packaging can also be environmentally qualified.

In embodiments, the gateway 11 can be configured with a bi-directional communication interface (which is referred to herein as "Southbound Services") to the physical asset(s) at a facility (e.g., wellsite) using either a wired communication protocol (such as a serial, Ethernet, Modbus or Open Platform Communication (OPC) protocol) or a wireless communication protocol (such as IEEE 802.11 Wi-Fi protocol, Highway Addressable Remote Transducer Protocol (HART), LoraWAN, WiFi or Message Queuing Telemetry Transport (MQTT)).

In embodiments, the gateway 11 can be configured with a bi-directional wireless communication interface (which is referred to herein as "Northbound Services") to the cloud computing environment 17 and to the remote management system 19 via the data communication network 18. In embodiments, the Northbound Services can include a cellular modem, which enables long-range data transmission. For example, the cellular modem can provide for 4G LTE data transmission capability (with 3G fallback capability) using suitable communication bands in different regions of the world. For facilities (e.g., wellsites) without a cellular signal, the Northbound Services can include a bidirectional satellite link supplied by an optional external satellite communication modem (such as a BGAN modem). In other embodiments, the Northbound Services can include a wired communication interface (e.g., wired Ethernet link) for communication to the cloud computing environment 17 and to the remote management system 19 via the data communication network 18.

In embodiments, the gateway 11 can employ an embedded processing environment (e.g., data processor and memory system) that hosts and executes the middleware 13 and the edge application(s) 15 as described herein.

In embodiments, the gateway 11 can employ both hardware-based and software-based security measures. The hardware-based security measures can involve a hardware root-of-trust established using an industry standard Trusted Platform Module (TPM) v2.0 cryptographic chip. The TPM v2.0 chip can be installed on the motherboard of the gateway 11. The software-based security measures can include operating system hardening and encryption of both buffered and transmitted data. In embodiments, the TPM v2.0 cryptographic chip can be used for device authentication and storing secrets. This chip contains a strong unforgeable identity in the form of a public-private key pair called the attestation key. This identity can be used to securely identify and connect the gateway 11 to the cloud computing environment 17 and/or to the remote management system 19. The attestation key stored in the TPM v2.0 cryptographic chip can be used to authenticate to the cloud computing environment 17 and to the remote management system 19. The attestation key can be configured during manufacturing and is subsequently used for building trust during device provisioning and connecting to the gateway 11. The TPM v2.0 cryptographic chip can also be used to store cryptographic secrets like keys or certificates on the gateway 11.

In embodiments, middleware 13 can embody an open and extensible software-based operating system which can be operably connected to the cloud computing environment 17 for monitoring and control of the physical asset(s) operably coupled to the gateway 11. The middleware 13 can also be operably coupled to the remote management system 19 for remote management of the gateway 11. The middleware 13 can provide for execution of one or more edge applications 15 on the gateway 11. Such edge application(s) 15 can be developed through an open software development kit.

In embodiments, the middleware 13 can provide open, modular, configurable, and extensible software-based middleware that executes on the gateway 11. In embodiments, the middleware 13 can support a containerized microservice-based architecture. This architecture enables extensibility into several distinct and different solutions for different environments and applications at the edge, while still using the same infrastructure components. In embodiments, the middleware 13 can be configured such that one or more edge applications(s) 15 can be embodied by a container. A container is a standard unit of software that packages up code and all its dependencies (such as runtime environment, system tools, system libraries and settings) so that the edge application runs quickly and reliably in the middleware computing environment. The container isolates software from its environment and ensure that it works uniformly and reliably in the middleware computing environment.

In embodiments, the middleware 13 can include the following service components:

Southbound service component: cooperates with the Southbound Services hardware interface of the gateway 11 to connect to one or more physical asset(s) at a facility (e.g., wellsite); this component can support several protocol services simultaneously to allow for data acquisition and communication with physical assets using different acquisition and communication protocols.

Northbound service component: cooperates with the Northbound Services hardware interface of the gateway 11 to communicate data between the gateway 11 and the cloud computing environment 17 and the remote management system 19 as applicable, and possibly to existing SCADA systems in multiple protocols if necessary.

Infrastructure services component: operates to provide a mechanism for service orchestration, exchange of messages between services and data storage at the edge.

Supporting services component: operates to perform data aggregation, management and reporting and application specific edge-processing services.

In embodiments, the middleware 13 can be based on Microsoft Azure IoT Edge technology as described in https://azure.microsoft.com/en-us/services/iot-edge/. This technology enables development, deployment, and remote management of customized edge applications 15 that are embodied by containerized microservices that execute in conjunction with the middleware services of the middleware 13 on the gateway 11.

In embodiments, the middleware 13 can also be configured to manage security services including TPM-based authentication of the edge application(s) 15 and authorized local access through a local user interface.

In one illustrative embodiment, the gateway 11 can employ an embedded processing environment that includes an Intel Atom E3930 Dual Core Processor operating at 1.86 GHZ, 2 GB of DRAM memory, 8 GB of eMMC memory, a TPM 2.0 security chip (with secure/measured boot support), two Gigabit Ethernet ports for Southbound and Northbound Services, two RS485/422 serial communication ports and one RS232 serial communication ports for Southbound Services, a 4G LTE modem for Northbound Services, a wi-fi radio supporting IEEE 802.11 a/b/g/n wireless modes for Southbound Services, an operating temperature of −40C to +70C, a 100-240v AC power source or 24V DC power source, a power consumption of less than 10 W, a Linux Debian LTS operating system, an enclosure of 10"×8"×4", CE (RED, ROHS), FCC, cULus, WEEE certification and compliance and NEMA4X (IP66) enclosure protection rating. In another illustrative embodiment, the gateway 11 can employ a similar embedded processing environment where the Intel Atom E3930 Dual Core Processor operating at 1.86 GHz is replaced by Intel Atom E3950 Quad Core Processor operating at 2.0 Hz, the 2 GB of DRAM memory is replaced by 8 GB of DRAM memory, and the 8 GB of eMMC memory is replaced by 32 GB of EMMC memory and 128 GB of SSD memory, which provides a power consumption of less than 20 W.

In embodiments, the gateway 11 can be configured to provide for open edge data aggregation. Specifically, a facility (e.g., wellsite) will typically have equipment, sensors, and control devices from a variety of different original equipment manufacturers (or OEMs), and each OEM brings their own data collection device or gateway. The gateway 11 can be configured to interface to different OEM devices using a wired communication protocol or wireless communication protocol as described herein. In this manner, the gateway 11 can be configured to provide open edge data aggregation for the equipment, sensors, and control devices from a variety of different original equipment manufacturers at a facility (e.g., wellsite), thus displacing the need of multiple OEM gateway devices. Moreover, the gateway 11 can be configured to collect other data types such as video, acoustics, and vibration, which then can be analyzed in the same environment.

In embodiments, the cloud computing environment 17 can embody one or more cloud applications that provide oil and gas operator users with real-time visualization of data communicated from the gateway 11 (such as events or alarms or sensor data pertaining to one or more physical assets operably coupled to the gateway 11) as well as interpretation and analysis of such data in order to determine the best strategy for corrective action for the one or more physical assets operably coupled to the gateway 11, if need be. Commands that carry out such corrective action can be communicated from the cloud computing environment 17 to the gateway 11 and relayed (or translated) for communication to the appropriate physical asset(s) operably coupled to the gateway 11. In embodiments, the cloud computing environment 17 can provide on-demand or managed computer system resources, such as data storage (cloud storage) and computing power. The computer system resources can possibly be distributed over multiple geographic locations to minimize latency and provide resiliency in case of network failure.

In embodiments, the platform can be configured in a distributed computing topology in which the information processing occurs both at the facility (e.g., wellsite) (by the edge application(s) 15 executing on the gateway 11) and remotely at the cloud computing environment 17 (by cloud application(s) executing in the cloud processing environment). This feature enables the extension of cloud-based domain-specific workflows and algorithms to the facility (e.g., wellsite).

In traditional approaches, there is no real-time processing of high-frequency data produced by the physical assets at a facility (e.g., wellsite). Moreover, the high cost of data transmission can prohibit communicating such high frequency data to a remote cloud computing environment. Therefore, most traditional systems communicate limited resolution and limited data to a remote cloud computing environment, thus limiting the insights that could be generated from the high frequency data. In embodiments, the gateway 11 can be configured with data processing capabilities that process high frequency data generated by one or more physical assets at a facility (e.g., wellsite). For example, such data processing capabilities can include data analytics, machine learning and/or artificial intelligence that detect and classify events that reflect operational state of the physical asset(s) at the facility (e.g., wellsite) based on the real-time data generated at the facility (e.g., wellsite). Data representing such events can characterize valuable insights as to the operational state of the physical asset(s) at the facility for surveillance and automation workflows at the facility (e.g., wellsite). Data can be communicated to the cloud computing environment 17 to generate appropriate alarms pertaining to the physical asset(s) at the edge facility (e.g., wellsite) as well as interpretation and analysis of the data in order to determine the best strategy for corrective action for operation of such physical asset(s), if necessary. Commands that carry out such corrective action can be communicated from the cloud computing environment 17 to the gateway 11 and relayed (or translated) for communication to the appropriate facility devices operably coupled to gateway 11. In embodiments, the cloud computing environment 17 can be managed by a cloud service provider, e.g., such as the Azure Cloud of Microsoft.

Moreover, each OEM device at the facility (e.g., wellsite) typically employs different data types and commands. It becomes a challenge to integrate the data types and commands for the collection of OEM devices at a facility (e.g., wellsite) into a single data ecosystem suitable for processing and analysis. The gateway 11 can be configured to solve this problem by bringing data and insights generated at the facility from all OEM devices at the facility into a unified data processing ecosystem. This removes data duplicity and integration challenges. Such data processing ecosystem can be proprietary or open systems selected by operators as suitable or appropriate.

Furthermore, traditional systems were built many decades ago, where the cybersecurity and asset protection were managed through isolation of the operational technology (OT) environment in the field. In embodiments, the gateway 11 can be configured with both hardware-based and software-based security measures that provide controlled access to the gateway 11 for monitoring and remote management of the gateway 11. Traditional systems required people to travel to the field and manually update the code of controllers or firmware of a sensor or software upgrade of the facility (wellsite) system, therefore limiting the ability to deploy innovative solutions and dynamic intelligence to the facility (wellsite). The gateway 11 can be configured to cooperate with the remote management system 19 to provide an over-the-air update (OTA) feature, which enables remote management of the components at the wellsite, including the physical asset(s), the gateway 11, the middleware 13 executing on the gateway 11, edge application(s) 15 executing on the gateway 11, and the security policies on the gateway 11. In embodiments, the over-the-air update (OTA) feature can provide for such management at scale, for example, including batch mode update of one or more of these edge components.

In embodiments, the cloud computing environment 17 can be configured to operate a data contextualization service component that manages a telemetry channel and a control channel with a respective gateway 11. Such data contextualization service component can also be responsible for establishing communication with, and processing data communication messages to and from the respective gateway 11.

In embodiments, the cloud computing environment 17 can be configured to store data and process data communicated to and from a respective gateway 11. Such stored data can be made available for application and domain specific workflow engines embodied by the cloud computing environment 17.

In embodiments, the cloud computing environment 17 can be configured to provide communication and storage of the physical asset data reliably with high availability and performance through a secure API gateway.

In embodiments, the cloud computing environment 17 can be configured to use HTTPS-based provisioning that allows the middleware 13 of the gateway 11 to securely connect to the cloud computing environment 17. Once the provisioning is successful, MQTT (with TLS enabled) can be used as communication protocol for the telemetry channel and the control channel with the respective gateway 11.

In embodiments, the cloud computing environment 17 can be configured to implement various microservice components, including functionality or operations of the data processing workflows as described herein.

In embodiments, the cloud computing environment 17 can be embodied by a proprietary or open system selected by operators as suitable or appropriate.

In embodiments, the remote management system 19 can be configured with edge device management services that provide field support for the components of one or more gateways 11 deployed at the facilities (e.g., wellsites). The remote management system 19 can be embodied by cloud processing environment that provides a management channel that connects to a respective gateway 11.

In embodiments, the remote management system 19 can be configured to provide for remote management of the edge devices deployed at the facilities (e.g. wellsites) over the entire lifecycle of such devices at scale, from site surveying to securely installing the gateway 11 and providing ongoing maintenance in the field. Such edge device management can involve a number of management functions, such as:

onboarding the gateway and/or the devices operably coupled thereto;

decommissioning the gateway and/or the devices operably coupled thereto;

monitoring the status of the gateway and/or the devices operably coupled thereto;

remotely configuring the gateway and/or the devices operably coupled thereto;

remotely updating software/firmware of the gateway and/or the devices operably coupled thereto; and sending non-domain-specific commands (e.g., reboot, shutdown etc.) to the gateway and/or the devices operably coupled thereto.

These functions can involve customized microservices, such as i) secure provisioning of the gateway 11 with minimal human input, or no human input at all, utilizing TPM-based device identity; ii) remote device un-provisioning and credential revocation; iii) device status monitoring, health, connectivity, security, performance; iv) secure and over-the-air updates for the middleware 13 and edge application(s) 15 that execute on the gateway 11; and v) logging and tracking of device interaction for audit and traceability.

In embodiments, the gateway 11 can be configured with a local user interface (UI) to support features such as device configuration, data visualization, etc. The local user interface can be accessed by connecting a mobile computing device to gateway 11 as shown in FIG. 1. For example, the mobile computing device can be operably coupled to the gateway 11 via a Southbound Services interface of the gateway 11 (e.g., Wi-Fi connection or Ethernet connection) as described herein. The mobile computing device can be a laptop computer, tablet, smart phone or other mobile computing device. To protect its privileged function, such local user interface can support user authentication for various deployment scenarios. The configuration of the gateway 11 can eliminate risk due to any unauthorized physical access by not storing any credentials either in plaintext or hashed form. User authentication can rely on existing secure IT servers or secure hardware tokens to store the secrets. In a reference implementation where the gateway 11 is connected to the Internet, user authentication can be performed using federation against one or more directories of authorized users. For disconnected scenarios where the gateway 11 is not connected to the Internet, user authentication can be performed using a secure hardware token that contains the user's public-private key.

In embodiments, the middleware 13 can be based on the Debian Linux operating system. The operating system can be hardened to ensure that it does not expose any unnecessary service or port to improve security. To achieve this, unnecessary services and ports are disabled. Furthermore, the gateway 11 can be configured such that it does not run any service for connection from external networks and only makes outbound connections to trusted domains. As such, there are no services that can be connected to exploit. Additionally, certain critical services such as device provisioning, software update, and device management can utilize runtime software that employs mutual authentication for strong security.

The remote management system 19 can be provided by a cloud computing environment (e.g., such as the Azure Cloud of Microsoft) with well-defined administrative controls. The cloud computing environment can be configured to enforce strong authentication for administrator accounts. For example, administrative account passwords can be managed by CyberArk privileged account management (PAM) solution that requires two factor authentications.

The remote management system 19 can be configured to act as a security broker to manage trust between other components of the platform, such as services of the cloud computing environment 17 that have no pre-configured trust with the gateway 11. As described above, the gateway 11 can use a TPM chip that enables the trust relationship with remote management system 19, which can be verified during provisioning. This method requires the public key of each gateway 11 to be pre-configured and stored by the remote management system 19.

Figure 2A:
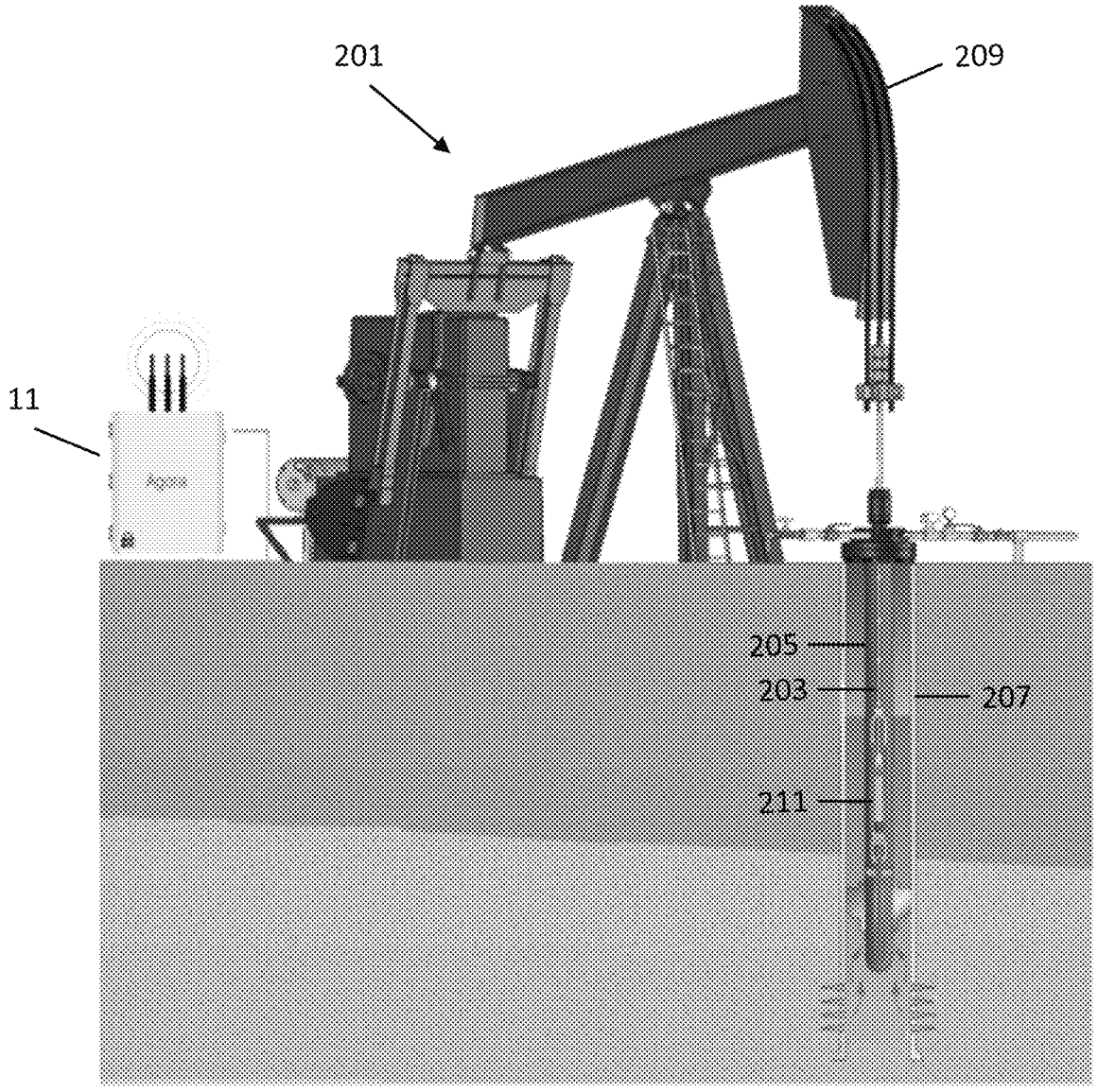
FIG. 2A is a schematic diagram of an exemplary rod pump system.
Figure 2B:
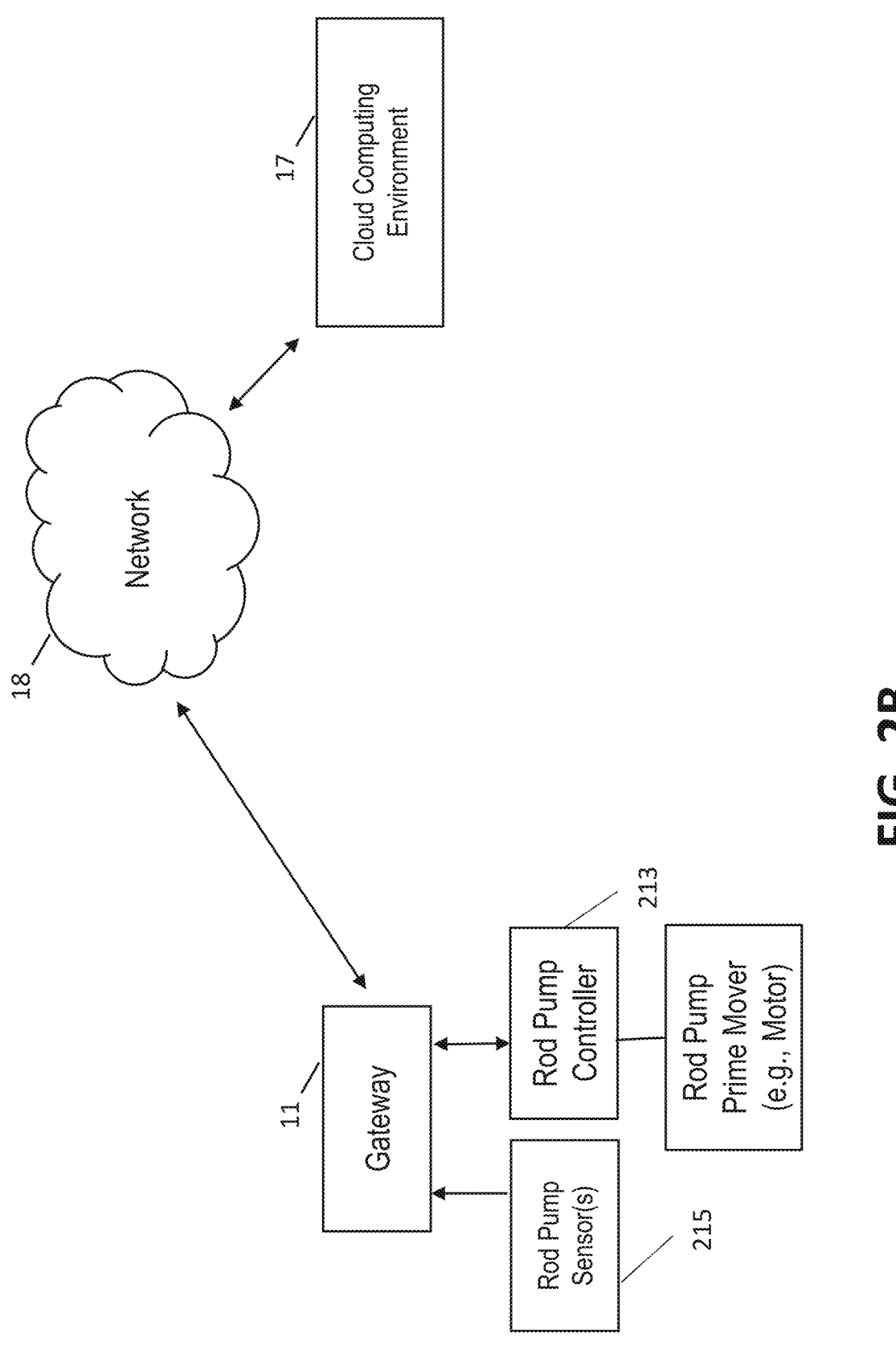
FIG. 2B is a schematic diagram of the distributed computing platform of FIG. 1 configured for operational surveillance and optimization of the rod pump system of FIG. 2A.
Figure 2C:
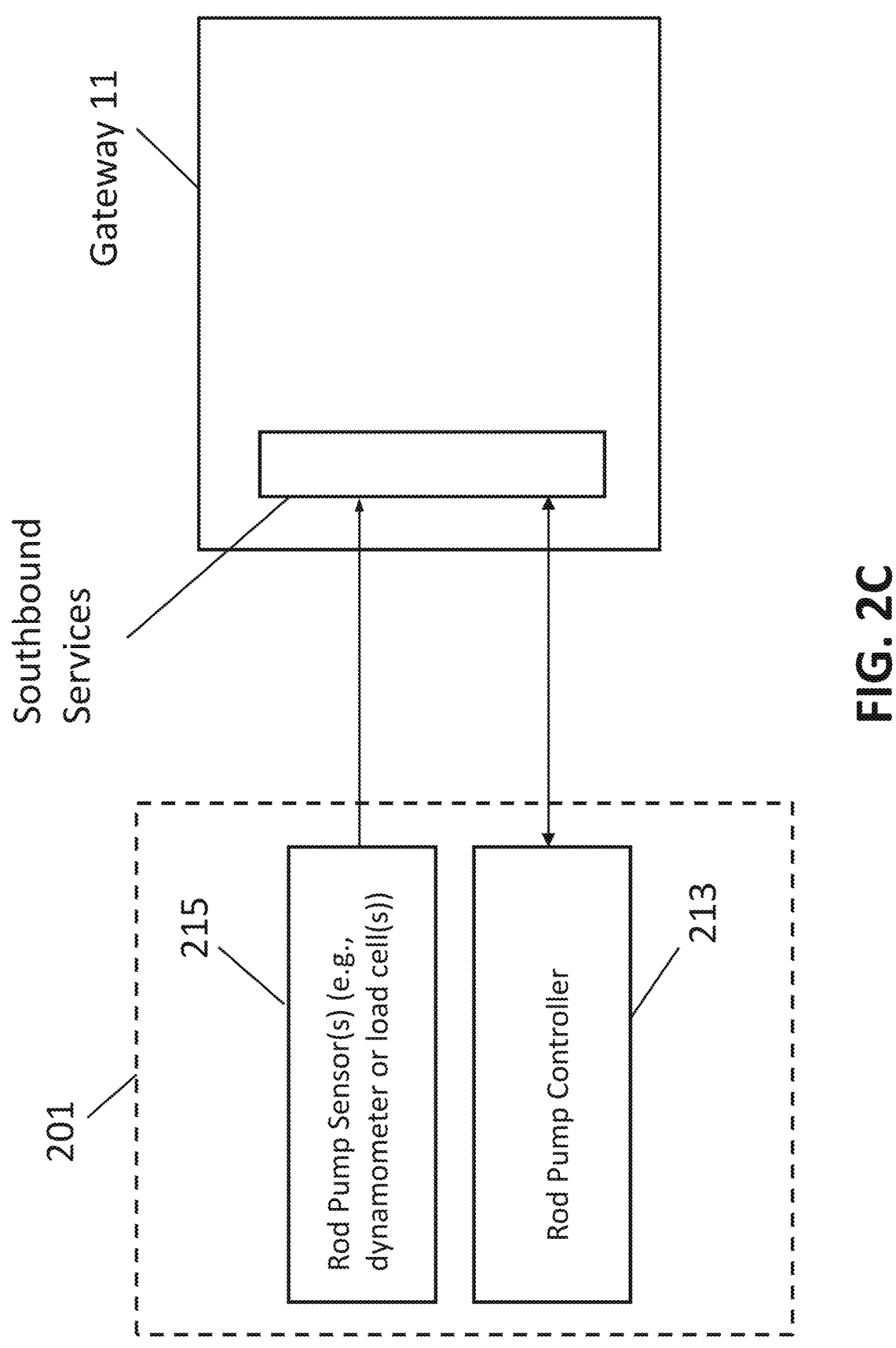
FIG. 2C is a schematic diagram that illustrates exemplary data communication interfaces between the gateway device and components of the rod pump system of FIG. 2B.

In embodiments, the gateway 11 can be operably coupled to a rod pump system 201 at a wellsite as illustrated in FIGS. 2A-2C. The rod pump system 201 includes a number of interconnected rods which are referred to as a rod string 203 that extends from the surface down production tubing 205 within a cased vertical well 207. The rod string 203 is coupled to an actuating device 209 at the surface. A subsurface pump 211 is coupled to the rod string 203 at a desired location in the tubing 205/well 207. The actuating device 209 is embodied by a pump jack of the walking beam type which is coupled to the rod string by a rod hanger. The actuating device 209 imparts reciprocating motion to the rod string along the central axis of the tubing 205 which causes the pump 211 to capture and lift reservoir fluids to the surface. The actuating device 209 is driven by a prime mover, which is typically embodied by an electric motor or internal combustion engine. The prime mover typically delivers high-speed, low-torque rotational power to a gear reducer, which converts that rotational power into low-speed, high-torque rotational power supplied to the pump jack. The pump jack converts the rotational power output by the gear reducer into reciprocating motion that lifts and lowers the rod string 203 connected to the subsurface pump 211. The operation of the prime mover is typically controlled by a controller 213 (referred to herein as a rod pump controller) that is operably coupled to the prime mover. The rod pump controller 213 is typically embodied by a computer-based system or other electronic control device. The rod pump system 201 further includes one or more sensors 215 that are configured to gather information about one or more operational states of the rod pump system. The sensor(s) 215 can be a conventional load cell or dynamometer which measures the tensile load of the rod string 203. Alternatively or additionally, the sensor(s) 215 can include a system which measures fluid height in the wellbore 207. Alternatively or additionally, the sensor(s) 215 can include other sensor systems that measure motor current, voltage, and/or instant RPM to evaluate the operational conditions of the motor/prime mover of the system. Alternatively or additionally, the sensor(s) 215 can include one or more flowmeters that measure the flow rate of the fluids pumped by the rod pump system to the surface over time. For example, the one or more flowmeters can measure the flow rate of oil, gas, and water pumped to the surface. The rod pump controller 213 and the sensor(s) 215 of the rod pump system 201 can be supplied by a variety of different OEM vendors or providers and thus can vary across rod pump systems at different wellsites. The rod pump controller 213 and the sensor(s) 215 of the rod pump system 201 are operably coupled to the gateway 11 at the wellsite as illustrated in FIG. 2B. For example, the rod pump controller 213 and the sensor(s) 215 of the rod pump system 201 can be operably coupled to the gateway 11 via a Southbound Services interface of the gateway 11 as described herein and illustrated in FIG. 2C.

Note that the architecture of FIG. 2B illustrates a gateway 11 and rod pump system 201 at a single wellsite for simplicity of description. In most applications, the gateway and rod pump system can be installed as pairs at multiple wellsites where the respective gateway devices communicate with the remote cloud computing environment 17 and the remote management system 19 as described herein for surveillance and control of the rod pump systems at the multiple wellsites.

Figure 3A:
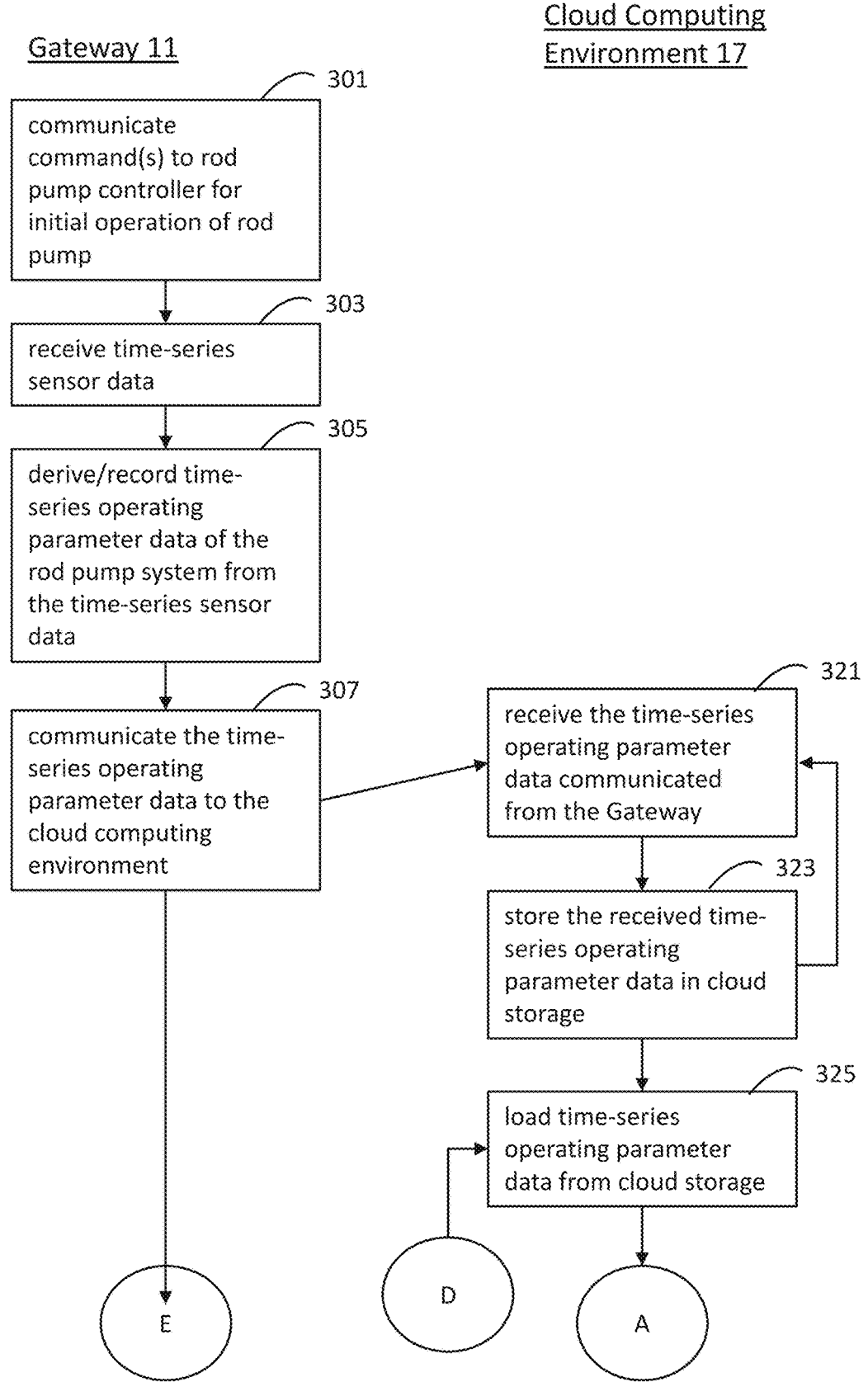
FIGS. 3A-3C, collectively, is a flowchart of a workflow that employs the distributed computing platform of FIG. 2B for operational surveillance and optimization of the rod pump system of FIG. 2A.
Figure 3B:
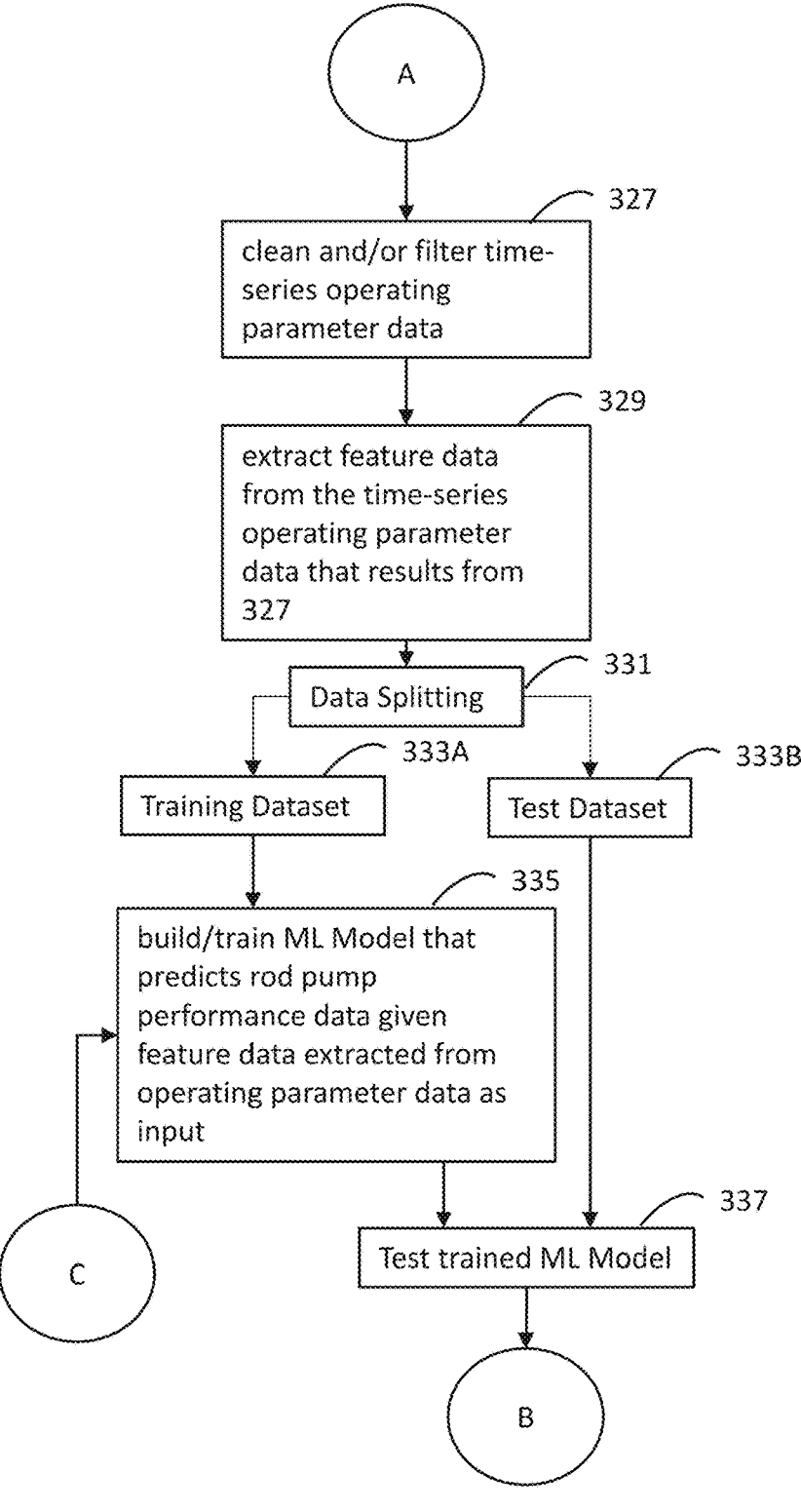
Figure 3C:
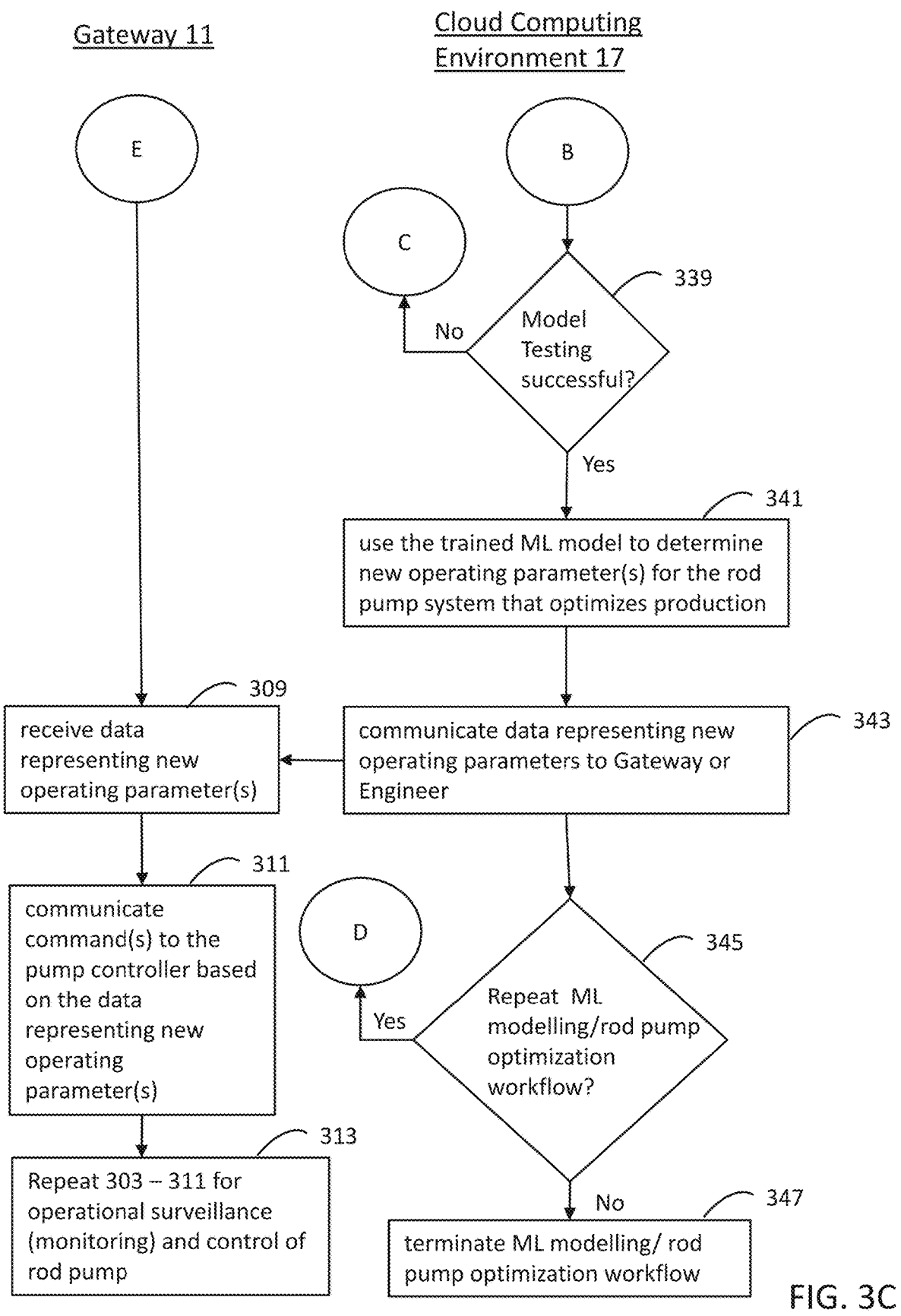

FIGS. 3A-3C depict an exemplary workflow that is carried out by the distributed information processing platform of FIGS. 2A-2C for operational surveillance and automated control of the rod pump system 201 at the wellsite. This workflow can be applied to multiple wellsites to allow for surveillance and control of the rod pump systems at multiple wellsites as needed.

The operations begin in block 301 wherein the gateway 11 communicates command(s) to the rod pump controller 213 for initial operation of the rod pump system 201.

In block 303, the gateway 11 receives time-series sensor data communicated from the sensor(s) 215 of the rod pump system 201.

In block 305, the gateway 11 is configured to derive and/or record time-series operating parameter data of the rod pump system 201 from the time-series sensor data received in 303. In embodiments, the time-series operating parameter data can represent operational conditions of the subsurface pump 211, such as rod displacement and loading (i.e., stress) as related to a Dynacard of the rod or other operational conditions of the subsurface pump 211. In embodiments, such operations can be performed as part of an Edge Application that executes on the gateway 11.

In block 307, the gateway 11 is configured to communicate the time-series operating parameter data of block 305 to the cloud computing environment 17. In embodiments, such operations can be performed as part of an Edge Application that executes on the gateway 11.

In block 321, the cloud computing environment 17 is configured to receive the time-series operating parameter data communicated from the gateway 11 in 307.

In block 323, the cloud computing environment 17 is configured to store the received time-series operating parameter data in cloud storage. The operations of 321 and 323 can be performed independently of the operations of 325 to 347 such that the cloud computing environment 17 stores time-series operating parameter data in cloud storage as it is communicated from the gateway 11 and received by the cloud computing environment 17.

In block 325, the cloud computing environment 17 is configured to access and load time-series operating parameter data from cloud storage.

In block 327, the cloud computing environment 17 is configured to clean and/or filter the time-series operating parameter data accessed in 325.

In block 329, the cloud computing environment 17 is configured to extract feature data from the time-series operating parameter data that results from the cleaning or filtering of block 327. In embodiments, the feature data can represent pump fillage or volume fraction of liquid in the pump, strokes per minute, shutdown period, run time, or other operational conditions of the subsurface pump 211. The volume fraction of liquid in the pump can be extracted from the Dynacard of the pump. So for each stroke the pump takes, the loading (i.e., stress) and displacement of the pump rod can be used to calculate the Dynacard of the pump, and the Dynacard can be processed to determine the volume fraction of liquid in the pump. The Dynacard (or dynamometer card) provides a visual representation of the pressure and volume that the piston of the rod pump experiences. When gas is present in the pump, during the compression cycle the piston first compresses it and the pressure observed on the Dynacard changes slowly. As soon as the piston contacts the liquid, due to the incompressible nature of the liquid, the pressure observed on the Dynacard changes suddenly. By comparing these two contrasting regions of the Dynacard in terms of piston movement (high pressure vs low pressure), the volume fraction of the liquid can be determined. The strokes per minute characterizes how many strokes the pump takes per minute when it is running. The shutdown period characterizes how long was the pump turned off between two run cycles. The run time characterizes how long the pump runs before it shuts down again and thus the period of time since the last shutdown. The shutdown of the pump can happen due to various reasons such as low liquid fraction in the pump. In embodiments, the feature data can represent rolling averages for these operating parameters over time. In embodiments, the feature data can characterize past behavior of the pump (e.g., at least one previous shutdown period of the pump) and the current operating condition of the pump (e.g., strokes per minute of the pump and the volume fraction of liquid in the pump).

In block 331, the cloud computing environment 17 is configured to perform data splitting of the feature data of block 329 into two parts: a training dataset 333A and a test dataset 333B.

In block 335, the cloud computing environment 17 is configured to use the training dataset 333A to build and train a machine learning (ML) model that predicts rod pump performance data given the feature data extracted from operating parameter data as input. In embodiments, the ML model is trained to predict a run time of the pump before it shuts down based on the feature data that characterizes past behavior of the pump (at least one previous shutdown period of the pump) as well as current operating conditions (strokes per minute of the pump and the pump fluid fraction in the pump). The prediction of the ML model is a regression problem and the output represents the predicted pump run time before it shuts down (e.g., in seconds). In training the machine learning model, different points in time can be identified by slicing the time-series operational data as a function of time, and such points in time can be used as unit records for the training. The feature data that characterizes past behavior of the pump (at least one previous shutdown period of the pump) as well as current operating conditions (strokes per minute of the pump and the pump fluid fraction in the pump) for the given point in time (unit record) can be associated with label data that represents run time of the pump until its next shut down as extracted from operating parameter data. In embodiments, the label data that represents run time of the pump until its next shut down for a given point in time can be determined from the time difference between the time of start of pump for the given point in time and the time for the next shutdown as extracted from operating parameter data. The feature data and associated label data for the different points in time can be used to train the ML model using conventional supervisory learning techniques. In this manner, the ML model is trained to relate the impact of the past and current operating parameters of the pump on its run time, which can be used to maximize the run time of the pump in order to maximize oil production from the pump as described herein.

In embodiments, the ML model can embody one or more linear models (such as Linear Regression, Ridge Regression, etc.), one or more tree-based models (such as a Random Forest Tree), one or more artificial neural networks, one or more Gaussian processes (such as Bayesian Linear Regression), and/or other suitable machine learning architecture(s).

In block 337, the cloud computing environment 17 is configured to use the test dataset 333B to test the trained ML model of block 335 to check the accuracy of the trained ML model. In block 339, if the accuracy of the trained ML model satisfies a predefined criterion for acceptance, the operations continue to block 341. Otherwise (where the accuracy the trained ML model does not satisfy the predefined criterion for acceptance), the operations revert back to block 335 to further train the ML model or possibly raise error conditions that require alternate processing or intervention.

In block 341, the cloud computing environment 17 is configured to use the trained ML model of block 331 to determine new operating parameter(s) for the rod pump system that optimize production. In embodiments, the operations of block 341 can determine new operating parameter(s) that will result in maximizing the oil production from the pump. For example, the new operating parameter(s) can reduce the speed of the pump and increase the shutdown period of the pump between runs when such changes will maximize the production from the well.

In block 343, the cloud computing environment 17 is configured to communicate data representing the new operating parameter(s) of block 341 to a production engineer or directly to the gateway 11. Specifically, the operations of block 343 can implement a manual or fully-autonomous mode. In the manual mode, the data representing the new operating parameter(s) of block 341 can be communicated by the cloud computing environment 17 to the production engineer for his/her review and analysis, for example using graphical user interface that presents the data representing the new operating parameter(s) of block 341 to the production engineer. Once satisfied by the review of the new operating parameter(s), the production engineer can accept and set the new operating parameter(s) for the rod pump using the graphical user interface and APIs of the gateway 11. In fully-autonomous mode, the data representing the new operating parameter(s) of block 341 are communicated directly to the gateway using the APIs of the gateway 11 without human involvement (i.e., from the production engineer).

In block 309, the gateway 11 is configured to receive data representing the new operating parameter(s).

In block 311, the gateway 11 is configured to communicate command(s) to the pump controller 213 that control the operation of the rod pump system 201, where the command(s) are based on the data representing new operating parameter(s).

In block 313, the operations of 303 to 311 can be repeated for operational surveillance (monitoring) and control of rod pump system 201.

In block 345, the cloud computing environment 17 is configured to determine whether to repeat or terminate the ML modelling/rod pump optimization workflow of blocks 325 to 345. For example, the decision to repeat or terminate the workflow can be based on manual user input from an engineer or by autonomous operations that detect an anomaly or fault in the operation of the rod pump system. For the case where the ML modelling/rod pump optimization workflow is to be repeated, the operations revert back to block 325 to repeat the operations of blocks 325 to 345. For the case where the ML modelling/rod pump optimization workflow is to be terminated, the operations continue to block 347.

In embodiments, the operations of the gateway 11 in blocks 301 to 313 can be performed as part of one or Edge Applications that execute on the gateway 11.

In embodiments, the operations of the cloud computing environment 17 in blocks 321 to 347 can be performed as part of one or more Cloud Applications that execute in the cloud computing environment 17.

The operations of blocks 325 to 345 determine the new operating parameter(s) of the rod pump system 201 based on the current condition for the pump and the reservoir, hence these operations should be repeated once the conditions of the reservoir or pump changes. The condition of the reservoir changes with time (pressure decreases); hence, the operations of blocks 325 to 345 can be configured to be executed at regular time intervals to consistently maintain the pump at best possible conditions. For example, the regular time intervals can follow a frequency based on one or more days, weeks, biweekly periods, months, etc.

Figures 4A, 4B:
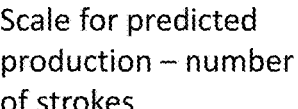
FIGS. 4A and 4B illustrate a two-dimensional map that can be used to determine an optimum production parameter of a rod pump system as part of the workflow of FIGS. 3A-3C.

In embodiments, the operations of block 341 can create a two dimensional map derived from the trained ML model of block 335 as shown in FIGS. 4A and 4B. The X and Y axes of the two-dimensional map of FIG. 4A represent a range of values for the new operating parameters of the system (i.e., strokes per minute (SMP) on the Y axis and shutdown period on the X axis). The points on map represent production from the well (such as number of strokes of the rod pump system per day), which is derived from the predicted run time output by the trained ML model given the operating parameters as input. The scale for the production represented by the points of the two-dimensional map is shown in FIG. 4B.

In embodiments, the trained ML model is used to create the points on the 2D map as follows. First, the output of the machine learning model is used to establish the relationship of the parameters (shutdown period, pump speed (SPM), and liquid fraction) with the next runtime of the pump between shutdowns. Once this relationship is established, the workflow can compute runtimes for a range of combination of shutdown periods and speed of pump for a given volume fraction (it is average of the last few run cycles-depends on how frequently the workflow is run). The result of these computations can be organized as a two-dimensional surface showing the impact of these two parameters on the runtime of the pump. Thus, for each combination of shutdown period and speed of pump, the two-dimensional surface determines the runtime of the pump that it will run for the next time it turns on. The workflow can use the shutdown period, speed of pump, and run time of pump to calculate the total number of strokes that the pump will take in a day (for each combination of shutdown period and speed). This data representing the total number of strokes that the pump will take in a day for each combination of shutdown period and pump speed is shown in the 2D plot. Specifically, if each shutdown period is t1 minutes and the workflow can predict that the pump will run after the shutdown period for t2 minutes, for each cycle of (t1+t2) minutes, the pump is running for t2/(t1+t2). The workflow can then calculate how many such cycles will happen in the day. This can be calculated by dividing the total number of minutes in the day by (t1+t2). So the total number of cycles will be 24*60/(t1+t2) and during the day, the pump will be running for 24*60/(t1+t2)*t2/(t1+t2)*(t1+t2)  minutes=24*60*(t2)/(t1+t2) minutes. Now if the speed of the pump is S strokes per minute (used in prediction), then the number of strokes in a day will be 24*60*t2/(t1+t2)*S. This value can then be multiplied by fluid fraction and volume of fluid displaced in each stroke of the pump (based on design of the pump) to calculate expected production for the day.

In embodiments, the relationship between the shutdown period, speed of the pump and run time for the next cycle can be established by training the ML model using historical training data (for example, over the last two months). The ML model can be visualized as f in the following relationship:

$$\text{Run time for next cycle} = f(\text{Pump speed,shut down period}).$$

The points on the two-dimensional map of FIG. 4A can be processed to identify the point corresponding to maximum production, and the operating parameters corresponding to that point can be selected as the new operating parameter(s) of the rod pump system 201 that optimizes production.

In embodiments, the filtering of the time-series operating parameter data performed in block 327 can be configured to extract time-series operating parameter data generated from the last X days in time (where X is a configurable time parameter), and thus omit time-series operating parameter data that was generated more than X days ago. In this configuration, the ML model of block 335 is trained to represent the relationship of the past and current operating parameters of the pump over the most recent X days on the run time of the pump. Note that the time parameter X may change from reservoir to reservoir, as how fast the reservoir conditions change will depend on the reservoir. This time parameter X can thus be tuned for each reservoir separately. In one example embodiment, the time parameter X can be set to 60 days.

Figure 5:
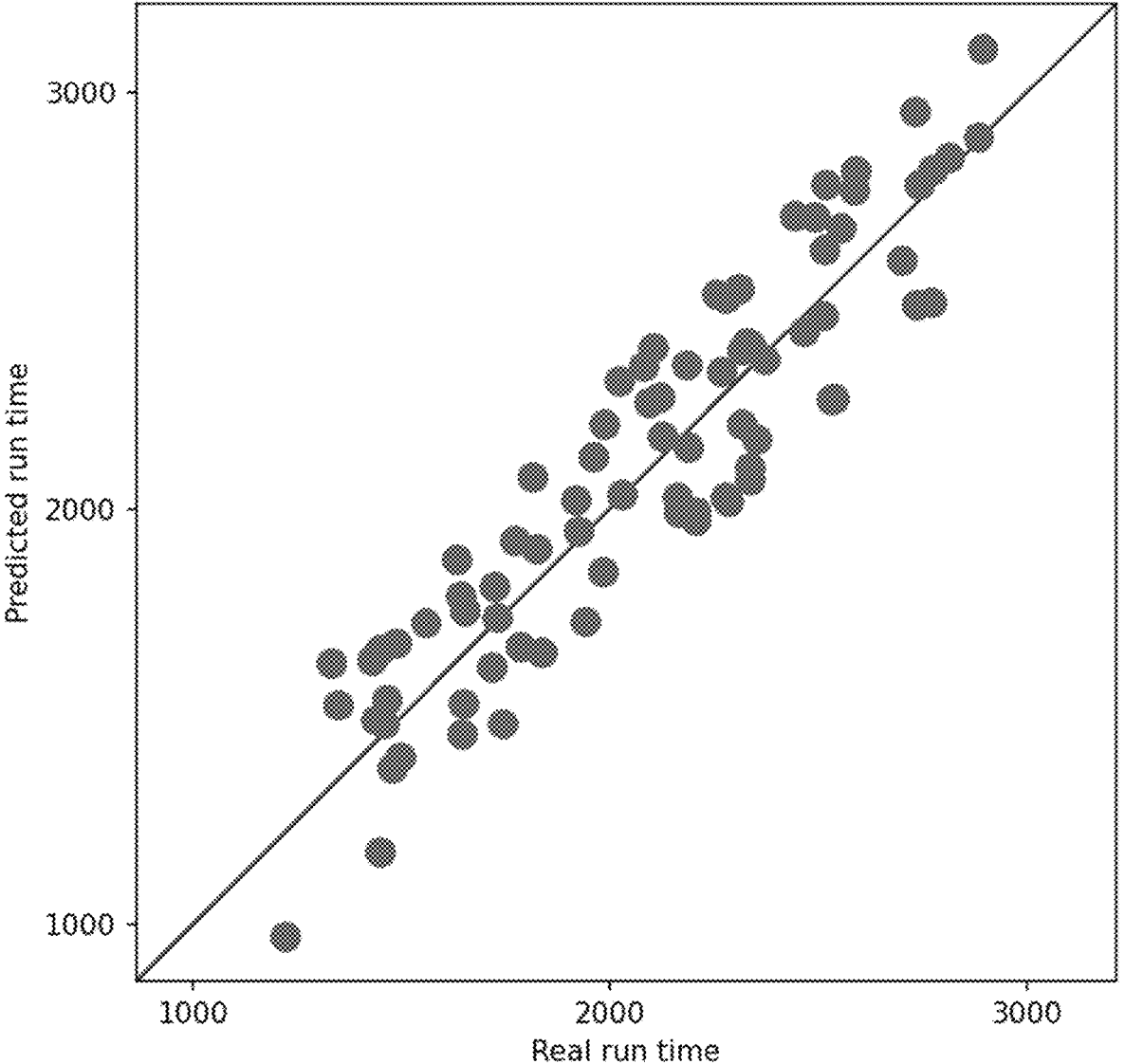
FIG. 5 is an exemplary plot of predicted run time until next shutdown output by a trained ML model derived from using a filtering time parameter (e.g., 60 days) with blind data relative to real run time results of a rod pump system.

In order to ensure selection of the appropriate time parameter X for the workflow, one can test the prediction of the run time output by the trained ML model derived from using the time parameter X with blind data and compare it against real run time results as shown in FIG. 5. If there is good correlation, the time parameter X can be selected as the appropriate time parameter for filtering out recent data that will lead to good results.

Figure 6:
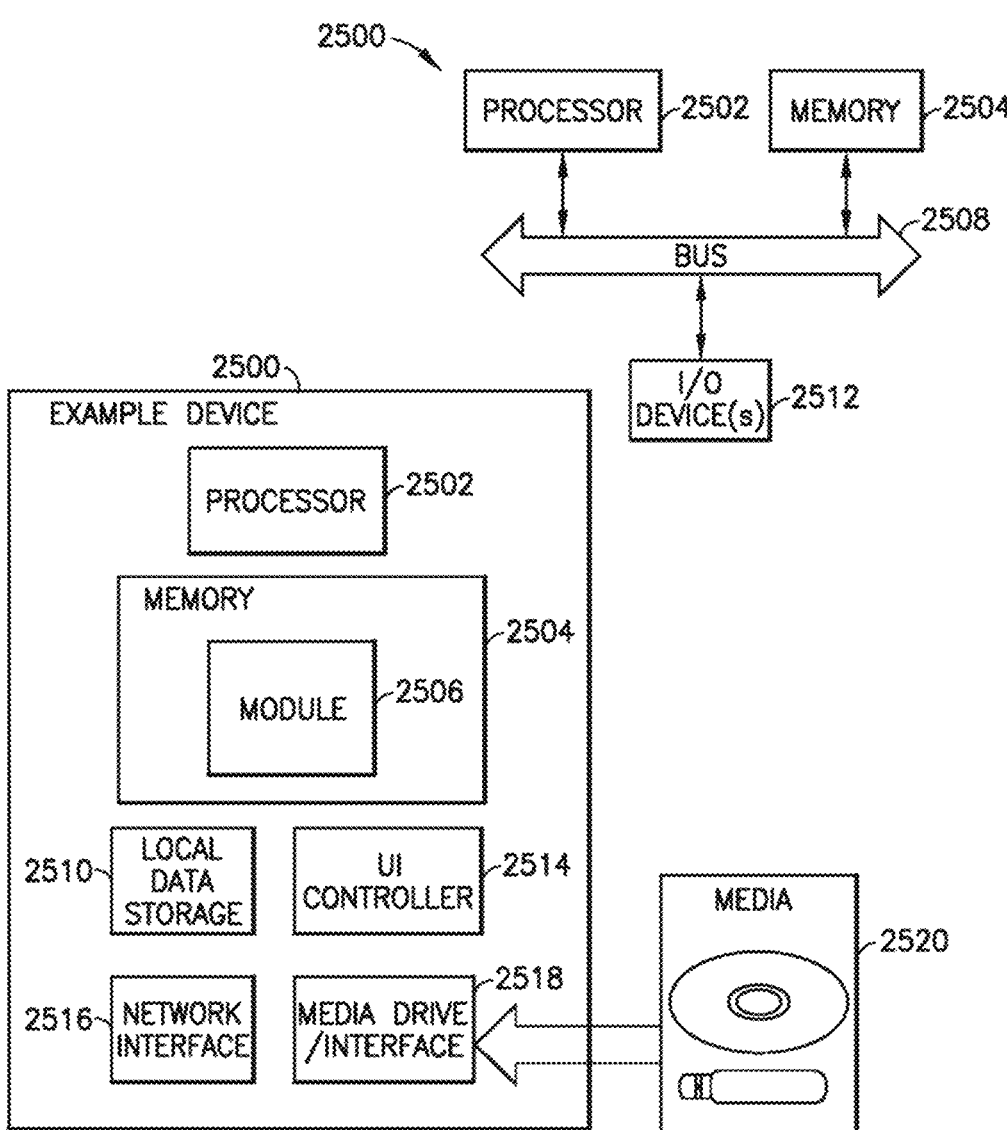
FIG. 6 is a functional block diagram of an exemplary computer processing system.

FIG. 6 illustrates an example device 2500, with a processor 2502 and memory 2504 that can be configured to implement various embodiments of the platform components (such as the gateway 11, cloud computing environment 17 and the remote management system 19)) and the methods and workflows as discussed in the present application. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth). One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network. A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various systems and processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable, and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer. Some of the methods and processes described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, general-purpose computer, special-purpose machine, virtual machine, software container, or appliance) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few example embodiments have been described in detail above, those skilled in the art will readily appreciate that many modifications are possible in the example embodiments without materially departing from this invention. For example, the methods and processes of the present disclosure can also be performed on organic matter isolated from the bulk formation sample in order to determine properties of the organic matter.

Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

There have been described and illustrated herein several embodiments of a distributed processing platform and related workflows that acquire, aggregate and process high frequency data generated by a rod pump system at a wellsite. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A system for controlling operations of a sucker rod pump system of a production well that produces reservoir fluids from a reservoir, the system comprising:

a gateway device disposed at a wellsite corresponding to the well; and a cloud-computing system disposed remotely from the wellsite and operably coupled to the gateway device;

wherein the gateway device comprises at least one first interface that is operably coupled to the sucker rod pump system and at least one second interface that is operably coupled to the cloud-computing system, wherein the gateway device is configured to communicate time-series operational data characterizing operation of the sucker rod pump system to the cloud-computing system; and wherein the cloud-computing system is configured to receive and store the time-series operational data communicated from the gateway device and repeatedly perform operations that:

i) process the time-series operational data to train a machine learning model that predicts run time of the sucker rod pump system until next shutdown, wherein the processing of the time series operational data involves:

filtering the time-series operational data; and extracting feature data from the filtered time-series operational data and using the feature data to train the machine learning model to predict the run time of the sucker rod pump system until the next shutdown, wherein the feature data characterizes both past behavior of the sucker rod pump system and current operating condition of the sucker rod pump system; and ii) use the trained machine learning model to determine new operating parameter data for use in controlling the sucker rod pump system, wherein the new operating parameter data maximizes production from the well.

2. The system according to claim 1, wherein:

the filtering of the time-series operational data is configured to extract time-series operational data generated within a predefined most recent time window.

3. The system according to claim 2, wherein:

the predefined most recent time window is selected or tuned for the reservoir.

4. The system according to claim 1, wherein:

the feature data that characterizes past behavior of the sucker rod pump system represents at least one previous shutdown period of the sucker rod pump system.

5. The system according to claim 1, wherein:

the feature data that characterizes current operating condition of the sucker rod pump system represents at least one of volume fraction of liquid in the pump, strokes per minute, and run time of the sucker rod pump system.

6. The system according to claim 1, wherein:

the machine learning model is trained using label data representing the run time of the sucker rod pump system until the next shutdown as extracted from the time-series operational data for different points of time of operation of the sucker rod pump system.

7. The system according to claim 1, wherein:

the trained machine learning model is used in ii) to predict the run time of the sucker rod pump system until the next shutdown over varying operating parameters, and the run time of the sucker rod pump system until the next shutdown over the varying operating parameters is used to calculate production over the varying operating parameters and determine the new operating parameter data that maximizes production from the well.

8. The system according to claim 1, wherein:

the new operating parameter data is used in controlling the sucker rod pump system in a manual mode that involves human review and acceptance of the new operating parameter data.

9. The system according to claim 1, wherein:

the new operating parameter data is used in controlling the sucker rod pump system in a fully-autonomous mode without human involvement.

10. The system according to claim 1, wherein:

the at least one first interface comprises at least one of a wired communication interface and a wireless communication interface; and the at least one second interface comprises at least one of a cellular data communication interface and a satellite data communication interface.

11. The system according to claim 1, wherein:

the sucker rod pump system comprises at least one sensor disposed at the wellsite; and the time-series operational data communicated from the gateway device to the cloud-computing system is based on sensor data produced by the at least one sensor.

12. The system according to claim 11, wherein:

the at least one sensor comprises a load cell or dynamometer which measures rod string tensile loading of the sucker rod pump system.

13. The system according to claim 1, wherein:

the sucker rod pump system comprises a controller that controls operation of a prime mover of the sucker rod pump system; and the new operating parameter data is used to generate at least one command communicated from the gateway device to the controller in order to control the operation of the sucker rod pump system.

14. A method for controlling operations of a sucker rod pump system of a production well that produces reservoir fluids from a reservoir, the method comprising:

providing a gateway device disposed at a wellsite corresponding to the well as well as a cloud-computing system disposed remotely from the wellsite and operably coupled to the gateway device, wherein the gateway device includes at least one first interface that is operably coupled to the sucker rod pump system, and at least one second interface that is operably coupled to the cloud-computing system;

configuring the gateway device to communicate time-series operational data characterizing operation of the sucker rod pump system to the cloud-computing system; and configuring the cloud-computing system to receive and store the time-series operational data communicated from the gateway device and repeatedly perform operations that:

i) process the time-series operational data to train a machine learning model that predicts run time of the sucker rod pump system until next shutdown, wherein the processing of the time series operational data involves:

filtering the time-series operational data; and extracting feature data from the filtered time-series operational data and using the feature data to train the machine learning model to predict the run time of the sucker rod pump system until the next shutdown, wherein the feature data characterizes both past behavior of the sucker rod pump system and current operating condition of the sucker rod pump system; and ii) use the trained machine learning model to determine new operating parameter data for use in controlling the sucker rod pump system, wherein the new operating parameter data maximizes production from the well.

15. The method according to claim 14, wherein:

the filtering of the time-series operational data is configured to extract time-series operational data generated within a predefined most recent time window.

16. The method according to claim 15, wherein:

the predefined most recent time window is selected or tuned for the reservoir.

\* \* \* \* \*